United States Patent Office 3,125,546
Patented Mar. 17, 1964

3,125,546
COMPOSITION AND PROCESS OF CROSSLINKING VINYL CHLORIDE POLYMER WITH DIALLYL MONOMER AND PEROXIDE CATALYST
Solomon Harris Pinner, London, Robert Roy Smith, Bergholt, Maurice Raymond Pettit, Brantham, and Edward Browell Atkinson, Ipswich, England, assignors to B.X. Plastics Limited, Essex, England, a British company
No Drawing. Filed Apr. 11, 1960, Ser. No. 21,078
Claims priority, application Great Britain Apr. 15, 1959
8 Claims. (Cl. 260—45.5)

This invention relates to the manufacture of copolymers having a network structure, and more especially, relates to copolymers derived from polyfunctional allyl monomers.

The terms block and graft copolymers have recently been introduced to describe polymers in which the constituent monomer units do not follow statistical laws but occur in long sequences. Synthetic operations similar to those used in the formation of block and graft copolymers have been found however to lead to polymeric structures which are distinct from either block or graft copolymers but appear to contain features of both types. Formula 1, for example, shows a long-sequence non-random copolymer where the sequences are formed end-to-end. This has been regarded as a typical block copolymer.

—AAAAABBBBBAAAAAAABBBAAAAAA—  (1)

The sequence of one kind of monmer may however all be attached as branches as in Formula 2. This has represented a graft copolymer.

```
—AAAAAAAAAAAAAAAAA
   B        B       B
   B        B       B
   B        B       B
   B        B       B
   B        B       B
                    B            (2)
```

A different product arises if, instead of branches, long bridges are formed as in Formula 3.

```
  AAAAAAAA
   B      B
   B      B
   B      B
  AAAAAAAAAA
   B      B
   B      B
   B    AAAAAAAAA                (3)
```

These have structural features common to both graft and block copolymers but have quite different mechanical properties. They are necessarily infusible in the absence of chemical degradation, but differ from crosslinked polymers by virtue of the presence of long and flexible chain bridges. Accordingly, polymers bearing these structures have been defined as network copolymers, and cured polyester resins and special types of cured rubber have been quoted as examples.

It has been proposed to manufacture copolymers which are believed to have a three-dimensional network structure by mixing a monomer, for example, an allyl ester, with a high polymer, for example, polyvinyl acetate, then adding a polymerization catalyst and polymerizing the mixture. The only catalyst specifically exemplified in this prior proposal is benzoyl peroxide which becomes active as a free radical generator at relatively low temperatures for example, 50° C. Hence it was necessary to compound the polymer and monomer first and to incorporate the catalyst later in a separate operation, or to carry out the mixing at an inconveniently low temperature.

The present invention provides a process for the manufacture of polymer-extended networks of allyl compounds which comprises intimately mixing a substantially linear high polymer with a minor proportion by weight of an at least bifunctional allyl monomer, incorporating in the mixture a free radical polymerisation initiator that, at a concentration of 0.1 mol of initiator per litre of pure diallyl phthalate monomer, will give a gelation time for pure diallyl phthalate monomer of 20 minutes at some temperature within the range 120° to 250° C., and thereafter heating the said mixture to a temperature within the range 120° to 250° C. to polymerise the at least bifunctional allyl monomer in the presence of the polymer.

As free radical "high temperature" initiators suitable for use in the process of the invention there may be mentioned, for example, tertiary-butyl perbenzoate, dicumyl peroxide, hydroxy-heptyl-peroxide, cumene hydroperoxide, pinane hydroperoxide, tertiary-butyl hydroperoxide, di-tertiarybutyl diperphalate, 2:5-dimethylhexane-2:5-dihydro-peroxide, di-tertiary-butyl-peroxide and tertiary-butyl hydroperoxide. There also come into consideration, however, diphenylethane compounds of the general formula

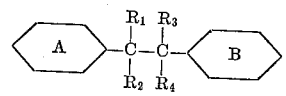

in which $R_1$ to $R_4$ are each selected from the group consisting of hydrogen and alkyl radicals containing up to 4 carbon atoms, at least two of $R_1$ to $R_4$ being alkyl radicals, and in which the benzene residues A and B are each selected from the group consisting of unsubstituted benzene residue, alkyl-substituted benzene residues and alkoxy-substituted benzene residues.

As such diphenyl-ethane compounds there may be mentioned, more especially [α-methyl-α-ethyl:β-methyl-β-ethyl] - diphenyl - ethane, [αα:ββ - tetramethyl] - diphenyl-ethane and [αα:ββ-tetraethyl]-diphenyl-ethane.

The criterion of whether a free radical polymerisation initiator is a "high temperature" initiator for the purpose of the present process is defined above with reference to the gelation time of monomeric diallyl phthalate. Stated in another way the gelation time of pure diallyl phthalate monomer at 120° C. must be at least 20 minutes, and for some temperature above 120° C. and up to 250° C. it must be not greater than 20 minutes, in each case using a concentration of 0.1 mol of the initiator per litre of pure diallyl phthalate monomer. The gelation time is the time required for a resin to reach the gel point, that is to say, the point in cross-linking polymerisation at which indefinitely large networks of polymer molecules are formed and an abrupt change in viscosity occurs, and is conveniently measured by the gel time meter, as described by Mageli, Stengel and Doehnert in "Modern Plastics," 1959, pages 135–140.

In order to determine whether an initiator is suitable for use in the present process it is merely necessary to determine the gelation time at three or more temperatures of pure diallyl phthalate monomer containing a concentration of 0.1 mol of the initiator per litre of diallyl phthalate, plot $$\log \frac{1000}{tg} \text{ against } \log \frac{1}{T}$$

where $tg$ is the gelation time and $T$ is the absolute temperature, and read off on the curve so obtained the temperature at which the gelation time is 20 minutes. If this falls within the range 120° to 250° C. (inclusive) the initiator can be used in the process of the invention.

It will be understood that the gelation time is a measure of the activity of the initiator and it has been found that it is a more relevant measure of activity than the half-life time of the initiator since it takes into account the effect of reactivities of the media and the activities of the radicals formed.

The high temperature initiator is advantageously used in a proportion of not less than 1.0% calculated on the weight of the allyl monomer.

The polyfunctional allyl monomer used in the process of the present invention must be compatible with the polymer (in the amounts used) under the conditions of polymerisation initiation, and must be substantially non-volatile under the conditions of the process. The term "polyfunctional" means in the present context a functionality of more than 2. As such allyl monomers, containing at least two olefinic double bonds, there may be mentioned diallyl succinate, diallyl adipate, diallyl sebacate, diallyl phthalate, diallyl fumarate, diallyl maleate, diallyl oxyethylene carbonate, triallyl aconitate, triallyl borate, triallyl citrate, triallyl cyanurate, triallyl pyromellitate, triallyl phosphate, triallyl aluminate, triallyl titanate, pyrogallol tris-(allyl carbonate), tetra-allyl benzene tetracarboxylate, tetra-allyl thiophosphonate, triallyl phenyl phosphate, allyl α-alkyl acrylate and allyl cinnamate.

As the linear high polymers used in the present process there may be mentioned polyethylene, polypropylene, polyisobutylene, polybutadiene, polystyrene, poly-methylacrylate, poly-ethyl-acrylate, poly-methyl-methacrylate polyvinyl chloride, and vinyl chloride-vinyl acetate copolymer. The term "polymer" is used herein to include copolymers, polycondensation products and macromolecular materials, especially cellulose acetate, cellulose acetobutyrate and natural rubber.

As stated above, the allyl monomer must be compatible with the polymer under the conditions of polymerisation initiation. Although plasticisation is widely practised in industry, the theory of compatibility and plasticisation are not fully understood. Consequently emperical methods are still necessary to establish whether any particular monomer or mixture of monomers are compatible with any particular polymer in the proportions in which it is proposed to use them. Such methods have shown, for example, the compatibility of polyvinyl chloride with diallyl phthalate, diallyl sebacate, diallyl adipate and triallyl cyanurate. Its compatibility with triallyl citrate, however, is relatively limited. With secondary cellulose acetate, triallyl citrate is a preferred allyl ester, while with polyethylene, compatibility is only achieved with compounds having long aliphatic chains, for example, diallyl sebacate, and then only at temperatures above the crystalline melting point.

The proportion of linear high polymer to allyl monomer used in the present process may vary from over 50 percent of polymer up to, for example, 95 percent of polymer, calculated on the weight of the polymer-monomer mixture. The mixtures of polymer and monomer may contain other ingredients, apart from the polymerisation initiator; for example, fillers, pigments and lubricants. The polymer and monomer, and, if desired, other ingredients are preferably blended by mechanical mastication at a temperature of at least 110° C., before polymerisation.

The process of the present invention has the advantage that it enables polymer-extended networks of allyl compounds to be made under conditions of processing which are much more convenient than those necessary in the case of the mixtures of polymers and monomers described in the aforesaid prior proposal in which benzoyl peroxide is used as catalyst, and where in consequence it is either necessary to add the catalyst in a separate stage or to compound the mixtures at relatively low temperatures. The present process does not exclude, however, using a low temperature polymerisation initiator, that is to say, an initiator that gives a gelation time for pure diallyl phthalate monomer of less than 20 minutes at 120° C. (at a concentration of 0.1 mol of initiator per litre of diallyl phthalate), for example, benzoyl peroxide, in a first stage of the polymerisation process and then completing the polymerisation with a free radical generator as hereinbefore defined.

The term "network" has been used in this specification merely as a convenient designation of the structure of the products, and it is believed that in most cases, especially where polyvinyl chloride is used as the polymer, the term "extended network copolymers" aptly describes the products obtained by the present process. It is to be understood, however, that the invention is to be in no way limited by this theoretical interpretation. The products obtained by the process of the present invention are attenuated allyl resins in which there should be an adequacy of bonding between the high polymer and the polymerised allyl compound to prevent separation. This latter requirement affects the nature and amount of polymerisation initiation needed. It is also desirable that the allyl monomer should not possess a long propagation chain length.

The invention also provides an uncured composition for use in the present process which comprises a polyfunctional allyl monomer (as hereinbefore defined), a substantially linear high polymer, and a free radical high temperature polymerisation initiator (as hereinbefore defined), the polymer being present in an amount in excess of the weight of allyl monomer present.

The invention also includes products obtained by the process of the invention, especially products which have been subjected to a shaping operation. Whereas polyfunctional allyl monomers when polymerised alone yield polymers which are excessively brittle, the copolymers obtained by the process of the present invention are more flexible and have other desirable physical properties. Products of the present invention obtained in the form of films have especially advantageous properties rendering them suitable for various applications.

The following examples illustrate the invention, the parts being by weight:

[Examples 1–5 illustrate the use of polyethylene to produce network copolymers with diallyl sebacate, which is compatible with polyethylene at temperatures above 100°.]

EXAMPLE 1

Low density polyethylene granules (Alkathene 2, registered trademark) were mixed with diallyl sebacate on hot twin-roll mills at 125° C. over a period of 15 minutes to form a homogeneous band. Rolling was continued for 3 minutes, when the appropriate amount of dicumyl peroxide was added. Mixing was continued for a further two minutes to disperse the dicumyl peroxide and the milled stock was stripped and quickly transferred to a preheated 1/16" cavity mould in a hydraulic press. The press was immediately closed and full pressure applied. After 45 minutes at 150–160° C., followed by 10 minutes' cooling, the pressure was released and the moulded sheet withdrawn. This operation was carried out with proportions of diallyl sebacate varying from 10 parts to 30 parts diallyl sebacate per hundred parts of polyethylene, together with dicumyl peroxide in the proportion 1 part to 10 parts of diallyl sebacate. In all cases, homogeneous transparent rubber-like sheets were obtained. The mechanical properties at room temperature and at 100° C. were measured, the results appearing in Table 1. For comparison, similar results on normal Alkathene 2 are included. The network copolymer is seen to have increased tensile strength and elongation at 100° C., but reduced tensile strength and modulus at room temperature in conformity with its non-crystalline character.

EXAMPLE 2

Intermediate density polyethylene granules (Hostalen GM-5000, registered trademark) were milled on twin-roll mills at 150° C. for 10 minutes to produce a uniform band. Diallyl sebacate was added incrementally over 15 minutes, the temperature being allowed to fall to 130° C. during this time, and rolling was continued for 3 minutes thereafter. The appropriate amount of dicumyl peroxide was added and mixing continued at 130° C. for a further 2 minutes. The proportions of diallyl sebacate and dicumyl peroxide varied as for Example 1 and the milled stock was stripped, pressed and tested as for Example 1. The results of tests at room temperature, 100° C. and 150° C. are shown in Table 2.

EXAMPLE 3

High density polyethylene granules (Merlex 50, registered trademark) were mixed with diallyl sebacate and the appropriate proportion of dicumyl peroxide as in Example 2. The milled stock was stripped, pressed and tested as for Example 2. The results are shown in Table 3.

EXAMPLE 4

This example was designed to reflect the increased density of junction points in the extended network copolymers resulting from increased proportions of the polyallyl esters.

Compositions of Alkathene 2, diallyl sebacate and dicumyl peroxide, as indicated in Table 4, were converted into clear sheets as described in Example 1. The sheets were cut into standard dumb-bells which were tested for elastic modulus at 150° C. by supporting in a glass-fronted oven at this temperature and observing the reversible elongation corresponding to a progressively increasing transmitted stress.

Table 4
ELASTIC MODULUS AT 150° C.

| Composition | | | Elastic modulus, p.s.i. |
|---|---|---|---|
| Parts of Diallyl sebacate | Parts of Alkathene 2 | Parts of Dicumyl peroxide | |
| 30 | 100 | 2 | 200 |
| 20 | 100 | 2 | 125 |
| 10 | 100 | 2 | 55 |
| 5 | 100 | 2 | 125 |
| 0 | 100 | 2 | 20 |
| 0 | 100 | | |

The increased elastic modulus at 150° C. with larger proportions of diallyl sebacate is a consequence of the increased network density.

EXAMPLE 5

A sheet made from Alkathene 2 (200 parts), diallyl sebacate (20 parts) and dicumyl peroxide (2 parts), in accordance with Example 1, showed no evidence of crystallinity when examined both by X-ray diffraction and by infra-red spectroscopy. The sample remained transparent throughout the temperature range −197° C. to 300° C. At 300° C., the sample began to char but did not melt or otherwise change shape. At −197° C., the sample was still non-crystalline and non-brittle. Other compositions of polyethylene, diallyl sebacate and dicumyl peroxide showed a similar lack of sensitivity to temperature.

EXAMPLE 6

This example relates to the use of polypropylene to form extended network copolymers. 100 parts of crystalline polypropylene (Carlona, registered trademark) were milled on twin-roll mills at 170° C. for 15 minutes, then 60 parts diallyl sebacate were added incrementally over 20 minutes, the temperature being allowed to fall to 130° C. during this time, and rolling was continued for 3 minutes thereafter. Six parts of dicumyl peroxide were added and mixing was continued at 130° C. for a further 5 minutes. The well-plasticised milled stock was transferred quickly to a preheated 1/16″ cavity mould in a hydraulic press and full pressure immediately applied. After 45 minutes at 150° C., cooling was applied for 10 minutes and the press was opened and the sheet withdrawn. A portion was placed on a hot plate at 300° C., when there was no visible deformation or distortion, whereas a sample of normal Carlona polypropylene rapidly melted and bubbled under these conditions.

EXAMPLE 7

This example relates to the use of natural rubber. 100 parts of smoked rubber sheet were mixed on water-cooled twin-roll mills with 20 parts of diallyl sebacate for 30 minutes, then 2 parts dicumyl peroxide added and mixing continued for 5 minutes. The milled stock was pressed for 40 minutes at 150° C., followed by 10 minutes cooling. The resultant translucent sheet resembled a vulcanised gum stock and was found to have a room temperature tensile strength of 660 p.s.i. and 1,000% elongation. Binary mixtures of smoked sheet and diallyl sebacate or binary mixtures of smoked sheet and dicumyl peroxide showed zero tensile strength when processed and tested in the same way, showing that all three components were necessary to produce the extended network copolymer.

Examples 8 and 9 describe extended network copolymers containing cellulose esters.

EXAMPLE 8

Cellulose aceto-butyrate and triallyl cyanurate were mixed in an enclosed mixer in the presence of acetone until gelatinous mixtures were formed. The compositions were then placed on water-cooled twin-roll mills to evaporate the acetone and form a band. After stoving at 70° C. to remove any residual acetone, the milled stock was pressed in a 1/16″ cavity mould at 130° C. for 30 minutes, followed by 10 minutes cooling. The resultant sheets were subjected to electrons from a 2 mev. Van de Graaff accelerator until the dose of 20M rads was accumulated. The mechanical properties are shown in Table 5 in comparison with unirradiated sheet.

Table 5
ROOM TEMPERATURE MECHANICAL PROPERTIES

| Parts of Triallyl cyanurate | Parts of Cellulose aceto-butyrate | Tensile strength, p.s.i. | Modulus, p.s.i. | Elongation, Percent | Tensile strength, p.s.i. | Modulus, p.s.i. | Elongation, Percent |
|---|---|---|---|---|---|---|---|
| 40 | 100 | 6,300 | 5,600 | 20 | 1,300 | 20,000 | 40 |
| 20 | 100 | 5,100 | 56,000 | 15 | 1,400 | 16,000 | 30 |
| 10 | 100 | 4,300 | 60,000 | 8 | 1,800 | 26,000 | 16 |

EXAMPLE 9

Cellulose acetate (100 parts) and triallyl citrate (30 parts) were mixed, stoved, pressed, irradiated and tested as described in Example 8. The results are shown in Table 6.

Table 6
ROOM TEMPERATURE MECHANICAL PROPERTIES

| Tensile strength, p.s.i. | Modulus, p.s.i. | Elong., Percent | Tensile strength, p.s.i. | Modulus, p.s.i. | Elong., Percent |
|---|---|---|---|---|---|
| 9,000 | 150,000 | 20 | 4,500 | 55,000 | 25 |

The irradiated extended network copolymers based on cellulose acetate had improved solvent resistance, softening point and surface hardness as compared with normal cellulose acetate compositions.

EXAMPLE 10

400 grams of cellulose acetate (acetyl value=52%), 140 grams of triallyl citrate, 400 grams of acetone, and 8 grams of dicumyl peroxide were mixed for 1½ hours at 40° C. in a Baker-Perkins mixer. The mixture was then milled to reduce its acetone content, and the resulting hide was pressed at 110° C. for 1 hour and then heated rapidly to 167° C. and cooled, the heating and cooling cycle taking 15 minutes. The sheet material so obtained was then treated at 60° C. for 20 hours to remove residual solvent.

The product was a hard, transparent sheet having a softening point (B.S. deflection method) of 142° C.

Examples 11–13 relate to extended network copolymers containing polyvinyl chloride.

EXAMPLE 11

Polyvinyl chloride (Corvic D 65/2, registered trademark) was premixed for 30 minutes with triallyl cyanurate and dibutyl tin laurate in a dough mixer in the proportion 30 parts triallyl cyanurate to 100 parts polymer. The premix was placed on twin-roll mills at 120° C., whereupon a homogeneous band was formed in 5 minutes. Dicumyl peroxide (2 parts) was then added and milling continued a further 2 minutes. The milled stock was transferred to a preheated 1/16" cavity mould and after 3 minutes at 130° C. with the press just closed, full pressure was applied for a further 3 minutes. After cooling, the sheet was removed and tested for mechanical properties after various periods of heating at 110° C. and 125° C.

The results appear in Table 7.

*Table 7*

MECHANICAL PROPERTIES AT 150° C.

| Cure time (hours) | Temp., °C. | Tensile strength p.s.i. | Modulus, p.s.i. | Elongation, percent |
|---|---|---|---|---|
| 1 | 100 | 180 | 900 | 20 |
| 3 | 110 | 450 | 2,200 | 20 |
| 1 | 125 | 180 | 700 | 25 |
| 2 | 125 | 520 | 5,200 | 10 |

EXAMPLE 12

Polyvinyl chloride (100 parts), triallyl cyanurate (30 parts) and dibutyl tin laurate (1 part) were mixed and pressed into sheet as described in Example 11, except that after 3 minutes under full pressure at 130° C., the temperature was increased to 150° C. over 5 minutes and held there for a further 5 minutes. After cooling, the 1/16" thick sheets were tested at 150° C. following various periods of heating at 150° C. The tensile strength, modulus and elongation at 150° C. of the sheet obtained from the press were 700 p.s.i., 1,500 p.s.i. and 45% respectively. Tests after 2 hours in an oven at 150° C. revealed only slight increases in tensile strength and modulus to 770 p.s.i., and 1,800 p.s.i. respectively, showing that formation of the extended network copolymers was essentially complete within the pressing cycle.

EXAMPLE 13

Polyvinyl chloride (100 parts) and dibutyl tin laurate (1 part) were mixed with 20, 40 and 60 parts of triallyl cyanurate respectively and pressed into sheet as described in Example 11, except that the total period of pressing at 150° C. was 20 minutes. The final dark-coloured sheets were tested mechanically at room temperature with the results shown in Table 8.

EXAMPLE 14

A premix of 200 parts of commercial polyvinyl chloride ("Corvic D 55/33") with 80 parts of triallyl cyanurate, 4 parts of dibutyl-tin bis-mono-butyl maleate and 1 part of stearic acid was poured on to a two-roll mill (roll temperatures 120° C. and 110° C.). The mixture formed a bond immediately. 4 minutes after the commencement of milling, 0.25 part of para-chlorobenzophenone was added to the hot mixture and was dispersed by working the hot plastic. After a further 5 minutes, the sheet was removed.

Portions of the milled sheet were pressed in a positive mould (0.015 inch thick) between polishing plates to obtain samples of smooth surface and uniform thickness. The maximum temperature attained during the pressing operation was about 165° C. and the heating cycle was 10 minutes.

Strips of the pressed material were irradiated under an ultra-violet lamp) Hanovia U.V.S. 3000) at a distance of 4 inches from the tube for (a) 10 minutes and (b) 40 minutes. During this operation the strips changed from a flexible to a rigid state, without significant discolouration. They were found to have high gel contents (measured in ethylene dichloride) and high tensile strengths at elevated temperatures.

*Table 8*

MECHANICAL PROPERTIES AT ROOM TEMPERATURE

| Parts of Triallyl cyanurate | Tensile strength, p.s.i. | Modulus, p.s.i. | Elongation percent |
|---|---|---|---|
| 60 | 10,500 | 125,000 | 25 |
| 40 | 9,300 | 100,000 | 20 |
| 20 | 8,500 | 100,000 | 20 |

*Table 1*

MECHANICAL PROPERTIES AT VARIOUS TEMPERATURES

| Composition | | | Tensile strength, p.s.i. | Modulus, p.s.i. | Elong., percent | Tensile strength, p.s.i. | Modulus, p.s.i. | Elong., percent |
|---|---|---|---|---|---|---|---|---|
| Pts. Diallyl sebacate | Pts. Alkathene | Pts. Dicumyl peroxide | | | | | | |
| 30 | 100 | 3 | 1,350 | 3,000 | 120 | 200 | 500 | 50 |
| 20 | 100 | 2 | 1,300 | 4,500 | 140 | 200 | 700 | 70 |
| 10 | 100 | 1 | 1,400 | 4,500 | 220 | 250 | 400 | 100 |
| 0 | 100 | 2 | ----- | ----- | ----- | ----- | ----- | ----- |
| 0 | 100 | 0 | 1,600 | 14,000 | 500 | 150 | 800 | 50 |

Table 2
MECHANICAL PROPERTIES AT VARIOUS TEMPERATURES

| Composition | | | Room temperature | | | 100° C. | | | 150° C. | | Appearance | Phase change on warming |
|---|---|---|---|---|---|---|---|---|---|---|---|---|
| Parts of Diallyl sebacate | Parts of Hostalen G.M. 5000 | Parts of dicumyl peroxide | Tensile strength, p.s.i. | Modulus, p.s.i. | Elongation, percent | Tensile strength, p.s.i. | Modulus, p.s.i. | Elongation, percent | Tensile strength, p.s.i. | Elongation, percent | | |
| 30 | 100 | 3 | 2,100 | 9,000 | 200 | 800 | 1,700 | 140 | 150 | 20 | Clear straw. | Nil. |
| 20 | 100 | 2 | 1,900 | 8,000 | 100 | 650 | 3,000 | 60 | 160 | 20 | ----do---- | Nil. |
| 10 | 100 | 1 | 2,200 | 11,000 | 280 | 900 | 1,000 | 260 | 160 | 50 | Opaque straw. | Slight. |
| 7 | 100 | 0.7 | ----- | ------ | --- | ----- | ----- | --- | --- | -- | | |
| 5 | 100 | 0.5 | ----- | ------ | --- | ----- | ----- | --- | --- | -- | | |
| 0 | 100 | 2 | ----- | ------ | --- | ----- | ----- | --- | --- | -- | | |
| 0 | 100 | 0 | 4,700 | 80,000 | 990 | 1,500 | 5,000 | 900 | 0 | -- | ----do---- | Marked. |

Table 3
MECHANICAL PROPERTIES AT VARIOUS TEMPERATURES

| Composition | | | Room temperature | | | 150° C. | | Appearance | Phase change on warming |
|---|---|---|---|---|---|---|---|---|---|
| Pts. Diallyl sebacate | Pts. Marlex 50 | Pts. Dicumyl peroxide | Tensile strength, p.s.i. | Modulus p.s.i. | Elong., percent | Tensile strength, p.s.i. | Elong., percent | | |
| 30 | 100 | 3 | 2,300 | 13,000 | 150 | 250 | 15 | Clear | Nil. |
| 20 | 100 | 2 | 2,300 | 10,000 | 270 | 200 | 20 | ----do---- | Nil. |
| 10 | 100 | 1 | 2,300 | 14,000 | 300 | 150 | 40 | ----do---- | Nil. |
| 5 | 100 | 0.5 | 2,000 | | | | | | |
| 0 | 100 | 2 | | | | | | | |
| 0 | 100 | 0 | 4,400 | 100,000 | 1,000 | 0 | -------- | Opaque | Marked. |

We claim:

1. A process for the manufacture of polymer-extended networks of allyl compounds, consisting of intimately blending by mechanically mixing at a temperature of at least 110° C., (1) a vinyl chloride polymer selected from the group consisting of vinyl chloride homopolymers and copolymers of vinyl chloride and vinyl acetate, (2) a compatible, polymerisable allyl monomer containing at least 2 olefinic double bonds, in a proportion of less than 50% of allyl monomer calculated on the total weight of allyl monomer and vinyl chloride polymer; and (3) at least 1%, calculated on the weight of the allyl monomer, of a free radical polymerisation initiator selected from the group consisting of organic peroxy-type compounds and diphenyl-ethanes of the general formula

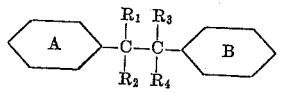

in which $R_1$ to $R_4$ are each selected from the group consisting of hydrogen and alkyl radicals containing up to 4 carbon atoms, at least two of $R_1$ to $R_4$ being alkyl radicals and in which the benzene residues A and B are each selected from the group consisting of unsubstituted benzene residues, alkyl substituted benzene residues and alkoxy substituted benzene residues, which initiator, at a concentration of 0.1 mol per litre of pure diallyphthalate monomer, will give a gelation time for pure diallyl phthalate monomer of 20 minutes at some temperature within the range of 120° C. to 250° C., and thereafter heating the mixture containing the initiator to a temperature within the range of 120° C. to 250° C. to effect cross-linking of the vinyl chloride polymer.

2. A process for the manufacture of polymer-extended networks of allyl compounds, consisting of intimately blending by mechanical mixing at a temperature of at least 110° C., (1) polyvinyl chloride, (2) a compatible, polymerisable allyl monomer containing at least 2 olefinic double bonds, in a proportion of less than 50% of allyl monomer calculated on the total weight of allyl monomer and polyvinyl chloride; and (3) at least 1% of a peroxy-type free radical polymerisation initiator, which initiates at a concentration of 1 mol per litre of pure diallyl phthalate monomer, will give a gelation time for pure diallyl phthalate monomer of 20 minutes at some temperature within the range of 120° C. to 250° C., and thereafter heating the mixture containing the initiator to a temperature within the range of 120° C. to 250° C. to effect cross-linking of the vinyl chloride polymer.

3. A process as claimed in claim 2, wherein the polymerisation initiator is dicumyl peroxide.

4. A process as claimed in claim 3, wherein the allyl monomer is triallyl cyanurate.

5. A process as claimed in claim 4, wherein the allyl monomer is used in a proportion of 5 to 40%, calculated on the total weight of (1) and (2).

6. A process for the manufacture of polymer-extended networks of allyl compounds, consisting of intimately blending by mechanical mixing at a temperature of at least 110° C., (1) a vinyl chloride polymer and (2) a compatible polymerisable allyl monomer containing at least two olefinic double bonds, the proportion of allyl monomer (2) not exceeding 50% of the total weight of (1) and (2) to form a paste, incorporating in the paste at least 1%, calculated on the weight of allyl monomer (2), of (3) an organic peroxy-type compound as free radical polymerisation initiator, which initiator, at a concentration of 0.1 mol of initiator per litre of pure diallyl phthalate monomer, will give a gelation time for pure diallyl phthalate monomer of 20 minutes at some temperature within the range of 120° C. to 250° C.; and thereafter heating the paste containing the initiator to a temperature within the range of 120° C. to 250° C. to effect cross-linking of the vinyl chloride polymer.

7. A composition of matter which consists essentially of an intimate mixture of (1) a vinyl chloride polymer selected from the group consisting of vinyl chloride homopolymers and copolymers of vinyl chloride and vinyl acetate, (2) a compatible, polymerisable allyl monomer containing at least two olefinic double bonds, in a proportion of at least 5 to less than 50% of allyl monomer, calculated on the total weight of (1) and (2), and (3) at least 1%, calculated on the weight of allyl ester (2) of a free radical polymerisation initiator selected from the group consisting of organic peroxy-type compounds and diphenyl ethanes of the general formula

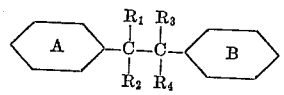

in which $R_1$ to $R_4$ are each selected from the group consisting of hydrogen atoms and alkyl radicals containing up to 4 carbon atoms, at least two of $R_1$ to $R_4$ being alkyl radicals, and in which the benzene residues A and B are each selected from the group consisting of unsubstituted benzene residues, alkyl substituted benzene residues and alkoxy substituted benzene residues, which initiator, at a concentration of 0.1 mol of initiator per litre of pure diallyl phthalate monomer, will give a gelation time for pure diallyl phthalate monomer of 20 minutes at some temperature within the range of 120° C. to 250° C.

8. A composition as claimed in claim 7, wherein the polymerisation initiator is dicumyl peroxide.

References Cited in the file of this patent

UNITED STATES PATENTS

| | | |
|---|---|---|
| 2,567,719 | Loritsch et al. | Sept. 11, 1951 |
| 2,609,353 | Rubens et al. | Sept. 2, 1952 |
| 2,707,177 | Skiff et al. | Apr. 26, 1955 |

OTHER REFERENCES

Flory: "Principles of Polymer Chemistry," pages 31–4, Cornell U. Press, Ithaca, New York, 1953.